United States Patent
Chen

(10) Patent No.: US 9,444,923 B1
(45) Date of Patent: Sep. 13, 2016

(54) METHOD OF RECEIVING AND REPLYING MESSAGES WITH A HANDS-FREE DEVICE

(71) Applicant: E-LEAD ELECTRONIC CO., LTD., Changhua (TW)

(72) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 0 days.

(21) Appl. No.: 14/928,366

(22) Filed: Oct. 30, 2015

(51) Int. Cl.
*H04M 1/60* (2006.01)
*H04M 1/725* (2006.01)

(52) U.S. Cl.
CPC ....... *H04M 1/6075* (2013.01); *H04M 1/72552* (2013.01)

(58) Field of Classification Search
CPC .................... H04M 1/6075; H04M 1/172552
USPC ....................................................... 455/569.2
See application file for complete search history.

(56) References Cited

U.S. PATENT DOCUMENTS

| | | | | |
|---|---|---|---|---|
| 6,973,333 B1* | 12/2005 | O'Neil | .................. | H04W 4/046 340/425.5 |
| 7,242,970 B2* | 7/2007 | Hong | .................. | H04M 1/6091 379/420.01 |
| 7,343,148 B1* | 3/2008 | O'Neil | .................. | H04W 4/046 340/539.13 |
| 7,873,374 B1* | 1/2011 | O'Neil | .................. | H04W 4/046 455/404.2 |
| 7,966,025 B1* | 6/2011 | O'Neil | .................. | H04W 4/046 455/404.2 |
| 8,634,816 B2* | 1/2014 | Xiao | ...................... | H04W 4/027 455/417 |
| 8,634,822 B2* | 1/2014 | Silver | ............... | H04M 1/72577 340/439 |
| 8,770,539 B1* | 7/2014 | Hsu | ..................... | B60R 11/0241 248/126 |
| 8,799,360 B2* | 8/2014 | Nicholson | ........................ | 701/1 |
| 8,874,162 B2* | 10/2014 | Schrader | ........... | H04M 1/72577 340/670 |
| 8,897,822 B2* | 11/2014 | Martin | .................... | H04W 4/12 455/410 |
| 8,914,012 B2* | 12/2014 | Crosbie | ................. | H04W 4/046 340/425.2 |
| 9,282,180 B2* | 3/2016 | Kobylarz | ................ | H04W 4/00 |
| 9,369,852 B2* | 6/2016 | Helm | ...................... | H04W 4/12 |
| 9,374,423 B2* | 6/2016 | Crosbie | ................. | B60W 50/14 |
| 2014/0068713 A1* | 3/2014 | Nicholson | ............. | H04W 12/06 726/3 |
| 2014/0106726 A1* | 4/2014 | Crosbie | ................. | H04W 4/046 455/418 |
| 2014/0257047 A1* | 9/2014 | Sillay | ...................... | A61B 5/11 600/301 |
| 2014/0342762 A1* | 11/2014 | Hajdu | ............... | H04M 1/72552 455/466 |
| 2015/0029041 A1* | 1/2015 | Liu | ........................ | G08G 1/143 340/932.2 |
| 2015/0050966 A1* | 2/2015 | West | ................. | H04M 1/72577 455/569.2 |
| 2015/0099495 A1* | 4/2015 | Crosbie | ................. | B60W 50/14 455/414.3 |
| 2015/0352953 A1* | 12/2015 | Koravadi | ................ | B60K 35/00 701/36 |
| 2015/0373622 A1* | 12/2015 | Tzannes | .................. | H04M 1/64 455/41.2 |
| 2016/0073240 A1* | 3/2016 | Helm | ...................... | H04W 4/12 455/412.2 |

* cited by examiner

*Primary Examiner* — Hai V Nguyen
(74) *Attorney, Agent, or Firm* — Wang Law Firm, Inc.

(57) ABSTRACT

A method of receiving and replying messages with a hands-free device includes a step of application installation; a step of connection; a step of communication; a step of analyzing the notification message; and a step of voice replying. With the method, text messages sent between mobile devices can be converted into voice messages, so that the user does not have to fetch the mobile device and read the text message, which improves the driving safety when communication is conducted during driving. The user also replies with voice message, which further improves drive safety. Furthermore, the method will prompt the message sending end to install an application program when there is no application program at the message sending end, consequently all potential contacts can be ensured to install the application program.

15 Claims, 2 Drawing Sheets

METHOD OF RECEIVING AND REPLYING MESSAGES WITH A HANDS-FREE DEVICE

BACKGROUND OF THE INVENTION

1. Field of the Invention

The present invention relates to a communication technology, and more particularly to a method of receiving and replying messages with a hands-free device.

2. Related Prior Art

With the rapid development of science and technology, mobile devices with communication abilities have become indispensible tools in daily life, which considerably reduces communication barriers of space and time and distance between people. Therefore, mobile device users mostly get used to using instant messages, however, instant messages cannot be received or sent at any time under any circumstances, such as when driving.

To ensure driving safety, the current law prohibits the use of handset device during driving. Therefore, a hands-free microphone has been widely available on the market, which allows the user to talk on the phone without holding the handset. However, talking while driving still distracts the user, which in turn poses a threat to safe driving.

With the development of the Internet, instant messaging is not limited to the traditional telephone mode, and a wide variety of communication software has replaced the traditional telephone, such as What's APP, Line, WeChat or Skype, or even the community websites, such as Face Book, SMS (short Message Service) or E-mail are also other forms of communication. However, the abovementioned non-talking communication methods are mainly conducted through message, so that the user can read the message at a convenient time, and after reading the message, the user can take time to think it over and then reply the message. The communication is not instant but overcomes the barriers of time and space, and therefore become popular.

Instant real time voice communication truly distracts the user and will cause safety concern. The non-instant text message communication still requires the user to fetch the mobile phone, read the message and then reply if needed. Therefore, all the above mentioned communication methods are unable to ensure safe driving.

Therefore, a device which is designed to reduce the number of times the user has to fetch the mobile device has been developed. When a call comes in, a processor in the mobile device will compare the in-coming call number with the contact list which has been stored in advance in the mobile device to find out the name of the caller of the incoming call, and then convert the name of the caller into text message which is finally converted into voice message, so that the user can choose to answer or ignore the incoming call after hearing the name of the caller, and thus the possibility of the user fetching the mobile device when driving.

However, the above device is only able to provide audible notification of the incoming caller ID but is unable to provide information exchange and communication. Hence, the potential danger associated with the fact that the user still has to answer or talk on the phone while driving still exists.

The present invention has arisen to mitigate and/or obviate the afore-described disadvantages.

SUMMARY

The present invention is aimed at providing a method of receiving and replying messages with a hands-free device, which is capable of overcoming the problem that driving safety will be hampered when drivers communicate with text messages while driving.

A method of receiving and replying messages with a hands-free device, comprising the following steps:

a step of application installation including installing an application program on the hands-free device and a message-receiving-end mobile device at a message receiving end, wherein the application program on the hands-free device obtains contact list data from the message-receiving-end mobile device, registers and enables the application program to be wirelessly connected to a private server;

a step of connection including wirelessly connecting the hands-free device to the message-receiving-end mobile device, wherein the hands-free device is connected to the Internet;

a step of communication including using a communication software installed on a message-sending-end mobile device of a message-sending end to send a message to the message-receiving-end mobile device, the application program of the hands-free mobile device fetching a notification message which is received by the message-receiving-end mobile device and sent from a server of the communication software;

a step of analyzing the notification message including using the application program of the hands-free device to analyze the type, sender and content of the notification message, displaying the notification message on a display screen of the hands-free device;

a step of voice replying, if the application program of the hands-free device detects that the sender of the notification message matches the contact list data of the application program, pressing a "reply" key, the hands-free device will be switched to a voice recording mode to start recording a voice message, then pressing a "stop" key to stop recording, and sending the voice message, by the application program of the hands-free device, to the message-sending-end mobile device, so that the message-sending-end mobile device at the message sending end hears the voice message reply from the message receiving end; and when the application program of the hands-free device detects that the sender of the notification message does not match the contact list data of the application program, it will continue to compare the sender of the notification message with a contact list data stored on the message-receiving-end mobile device, and if a matched telephone number is found, a step of voice reply and temporary storage and a step of a post-communication installation of an application program will be carried out;

wherein the step of the voice reply and temporary storage includes switching the hands-free device to the voice recording mode to start recording a voice message, pressing the "stop" key when the recording is done, then the voice message will be sent to and temporarily stored in the private server via the application program; and the step of the post-communication installation of an application program is carried out after the step of the voice reply and temporary storage and includes: sending a prompt message to the message-sending-end mobile device by using the application program, the prompt message is a short message service message, the content of the prompt message is a website address for downloading the application program to prompt the user of the message-sending-end mobile device to download and install the application program, when the user of the message-sending-end mobile device downloads, installs, registers and starts using the application program, the application program of the message-sendingend mobile device will be connected to the private server to fetch the temporarily stored voice message, and the message-sending-end mobile device will play the voice message from the message receiving end.

It is learned from the above description that the present invention is able to convert the text messages sent between mobile devices into voice messages, so that the user does not have to fetch the mobile device and read the text message, which improves the driving safety when communication is conducted during driving. In addition to the fact that the received message is converted into voice, the user also replies with voice message, which further improves drive safety since the user does not have to text message while driving. Furthermore, the present invention will prompt the message sending end to install an application program when there is no application program at the message sending end, so that all potential contacts can be ensured to install the application program, namely, the abovementioned functions and effects of the present invention can be shared by all potential contacts simultaneously.

DETAILED DESCRIPTION

The present invention will be clearer from the following description when viewed together with the accompanying drawings, which show, for purpose of illustrations only, the preferred embodiment in accordance with the present invention.

Figure 1:
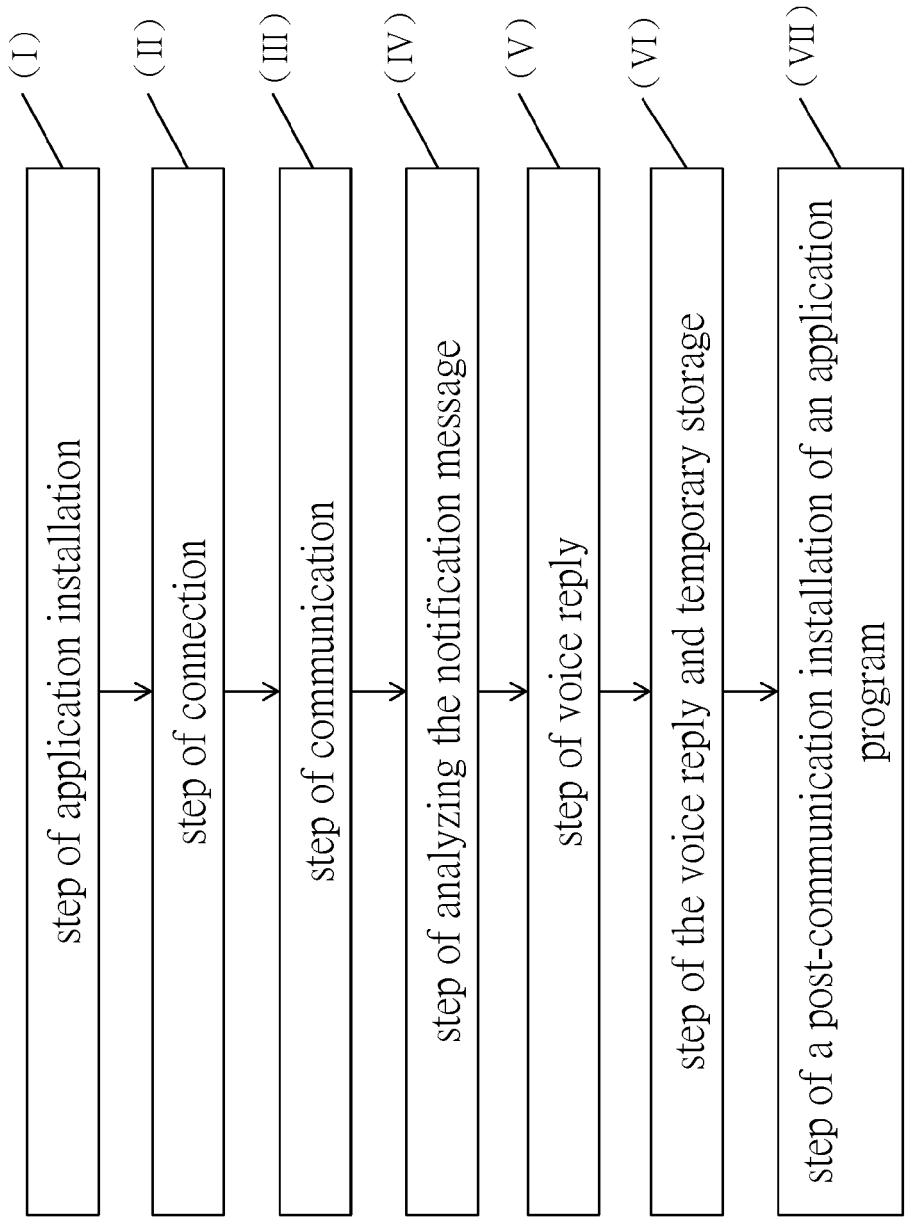
FIG. 1 is a flow chart of a method of receiving and replying messages with a hands-free device in accordance with a preferred embodiment of the present invention.
Figure 2:
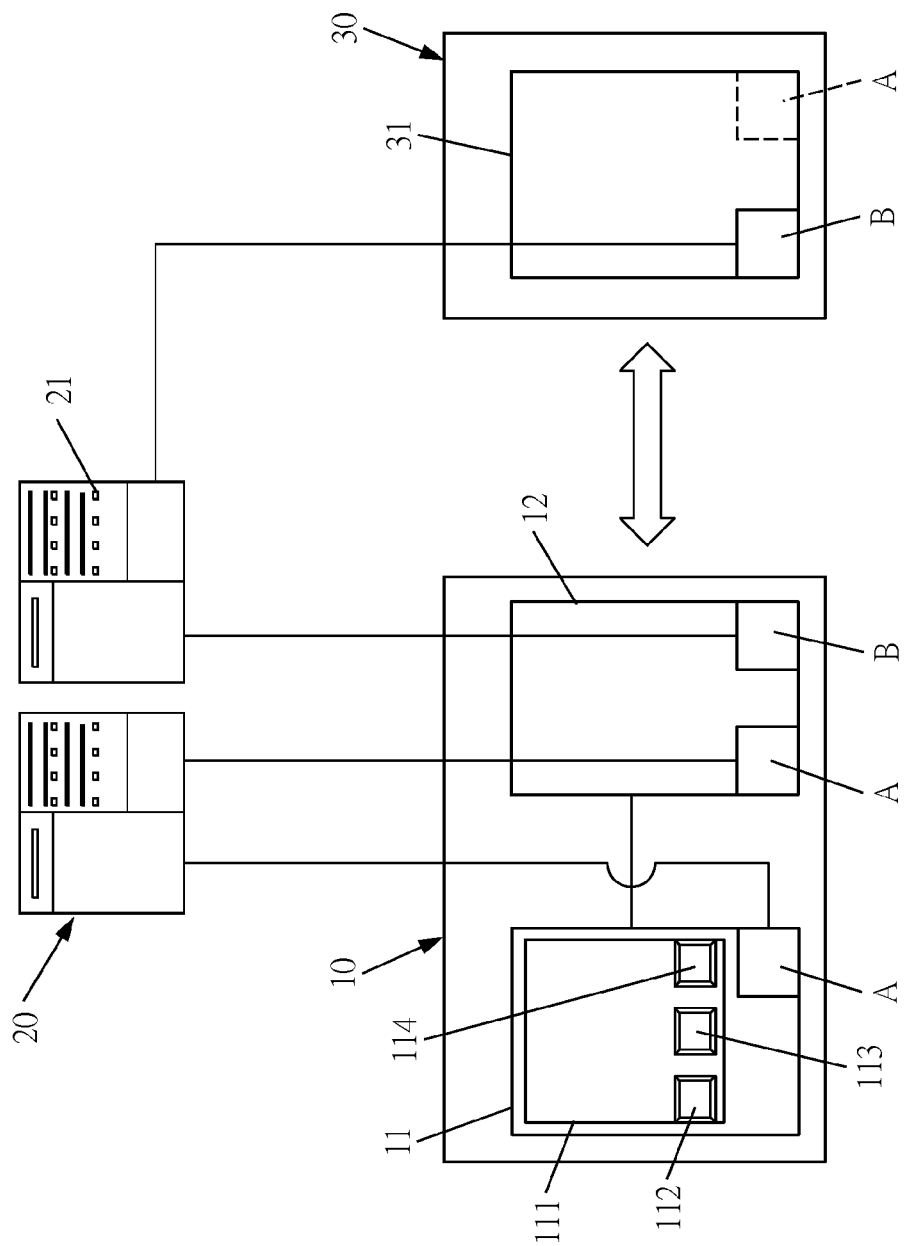
FIG. 2 is a framework illustrating the method of receiving and replying messages with a hands-free device in accordance with a preferred embodiment of the present invention.

Referring to FIGS. 1-2, a method of receiving and replying messages with a hands-free device in accordance with a preferred embodiment of the present invention comprises the following steps:

Step I of application installation includes respectively installing an application program A on a hands-free device 11 and a message-receiving-end mobile device 12 at a message receiving end 10. The application program A on the hands-free device 11 acquires a contact list data from the message-receiving-end mobile device 12, wherein the hands-free device 11 can be a watch, an in-car computer, an in-car audio, an in-car head up display (HUD), or a satellite navigation system. The message-receiving-end mobile device 12 can be a smart phone or a tablet with IOS or Android system. Register and enable the application programs A to be wirelessly connected to a private server 20. Therefore, after the installation program A is, for the first time, installed on the hands-free device 11 and the message-receiving-end mobile device 12, the application program A on the message-receiving-end mobile device 12 will acquire a contact list data which is stored in the message-receiving-end mobile device 12, and the application program A installed on the hands-free device 11 will synchronize the contact list data (including the contact list data in the application program A and in the message-receiving-end mobile device 12) via the private server 20 or the message-receiving-end mobile device 12. At this moment, the contact list data in the hands-free device 11, the message-receiving-end mobile device 12 and the private server 20 will be synchronized (which is called triple synchronization). As it continues to be used, the message-receiving-end mobile device 12 might change the contact list data again. Therefore, every time when the application program A is started, triple synchronization of the contact list data will be performed again, just like the application program A is installed for the first time.

Step II of connection includes wirelessly connecting the hands-free device 11 to the message-receiving-end mobile device 12. In this embodiment, the hands-free device 11 and the message-receiving-end mobile device 12 are connected via Bluetooth or BLE (Bluetooth Low Energy) or WI-FI, and the hands-free device 11 can be connected to the Internet by itself or through the message-receiving-end mobile device 12.

Step III of communication includes using a communication software B installed on a message-sending-end mobile device 31 of a message sending end 30 to send a message to the message-receiving-end mobile device 12 via a server 21 storing the communication software B. The message sent by the message-sending-end mobile device 31 includes text message, picture or voice message. When in a car and the message-receiving-end mobile device 12 is in a standby mode, if the server 21 sends the message to the message-receiving-end mobile device 12 via the communication software B, it will also synchronously send a notification message. In this embodiment, the notification message includes a part of or the whole aforementioned message. Or, the communication software B of the message-sending-end mobile device 31 only sends a notification message to the message-receiving-end mobile device 12 (indicating that there is an incoming message) via the server 21, and the notification message will be displayed on the display screen of the message-receiving-end mobile device 12 and give a message to the user of the message-receiving-end mobile device 12, so that when the user of the message-receiving-end mobile device 12 opens the communication software B to establish connection to the server 21 of the communication software B to download or synchronize the message. The application program A of the hands-free device 11 fetches the notification message which is received by the message-receiving-end mobile device 12 and sent from the communication software B. The message-sending-end mobile device 31 is a smart phone or a tablet with IOS or Android system, the message-receiving-end mobile device 12 is a smart phone with Android system, and the message notification message is sent to the hands-free device 11 via WIFI, Bluetooth or BLE. The message-receiving-end mobile device 12 is a smart phone with IOS system, and the message notification message is sent to the hands-free device 11 via BLE.

Step IV of analyzing the notification message includes using the application program A of the hands-free device 11 to analyze a type, a sender and a content of the notification message. For example, the type of the communication software B can be What's APP, Line, WeChat or Skype, or even Face Book, SMS (short Message Service) or E-mail or other forms of communication, the user name of the sender or the account or nickname sent from the Line or Skype. The application program A of the hands-free device 11 detects the type of the notification message by analyzing the content of the notification message, and decides whether or not to read the notification message based on the detected type of the notification message. The notification message includes text message, picture message or voice message. When the application program A detects that the notification message is a picture message, it will display the notification message on a display screen 111 of the hands-free device 11. When the application program A detects that the notification message is a text message, it will convert the text message into voice message which will be played on the hands-free device 11 by TTS. When the application program A detects that the notification message is a voice message, the voice message can be played directly by the hands-free device 11, and the notification message can be played repeatedly by pressing a "play" key 112.

Step V of voice replying includes pressing a "reply" key 113 to make the application program A of the hands-free device 11 compare the sender of the notification message with the contact list data of the application program A, and make a reply based on the following conditions:

Condition 1: when the application program A of the hands-free device 11 detects that the sender of the notification message matches the contact list data of the application program A, the hands-free device 11 will be switched to a voice recording mode to start recording a voice message, so that the message receiving end 10 can record the voice message which is a reply to be sent to the message sending end 30, and a "stop" key 114 should be pressed after the voice recording is done. The recorded voice message is then sent to the message-sending-end mobile device 31 via the application program A, so that the message sending end 30 can hear the voice message replied from the message receiving end 10. When the "reply" key 113 is being pressed, the private server 20 will simultaneously control the application program A of the message receiving end 10 and the message sending end 30 to open a chat room.

Condition 2: when the application program A of the hands-free device 11 detects that the sender of the notification message does not match any of the contact list data of the application program A, it will continue to compare the sender of the notification message with the contact list data stored on the message-receiving-end mobile device 12, and if a matched telephone number is found, a step VI of voice replying and temporary storage and a step VII of a post-communication installation of an application program will be performed.

The step VI of the voice replying and temporary storage includes switching the hands-free device 11 to the voice recording mode to start recording a voice message, pressing the "stop" key 114 after the voice recording is done, and the recorded voice message will be sent to and temporarily stored in the private server 20 via the application program A.

The step VII of a post-communication installation of an application program is carried out after the step VI of the voice replying and temporary storage and includes: sending a prompt message to the message-sending-end mobile device 31 by using the application program A. The prompt message is SMS message, and the content of the prompt message is a website address for downloading the application program A to prompt the user of the message-sending-end mobile device 31 to download and install the application program A. If the application program A of the hands-free device 11 analyzes the content of the notification message and decodes the API (application program interface) of the communication software B, then the application program A can send the prompt message to the communication software B of the message-sending-end mobile device 31 by using the API instead of the SMS. When the user of the message-sending-end mobile device 31 downloads, installs, registers and starts using the application program A, the application program A of the message-sending-end mobile device 31 can be connected to the private server 20, so that the private server 20 will send the temporarily stored voice message to the application program A of the message sending end 30, and the user of the message-sending-end mobile device 31 can hear the voice message from the message receiving end 10. The private server 20 will simultaneously control the application program A of the message receiving end 10 and the message sending end 30 to open a chat room.

Condition 3: when the application program A of the hands-free device 11 detects that the sender of the notification message does not match any of the contact list data of the application program A, it will continue to compare the sender of the notification message with the contact list data stored on the message-receiving-end mobile device 12, and if no matched telephone number is found, more than one contact list data will be displayed on the display screen 111 of the hands-free device 11 to let the user manually select and identify the identity of the message sending end 30. Or, the application program A of the hands-free device 11 compares the sender of the notification message with the contact list data stored on the message-receiving-end mobile device 12, the results are sequenced based on the matching rate and will be displayed on the display screen 111 to allow for manual selection and identification of the identity of the message sending end 30. After selection and identification, the hands-free device 11 will continue to perform the step VI of voice replying and temporary storage and the step VII of a post-communication installation of an application program.

Condition 4: when the application program A of the hands-free device 11 detects that the sender of the notification message does not match the contact list data of the application program A, more than one contact list data will be displayed on the display screen 111 of the hands-free device 11 to let the user select the identity of the message sending end 30. Or, the application program A of the hands-free device 11 compares the sender of the notification message with the contact list data stored on the message-receiving-end mobile device 12, the results are sequenced based on the matching rate and will be displayed on the display screen 111 to allow for manual selection and identification of the identity of the message sending end 30. After selection and identification, the hands-free device 11 will continue to perform the step VI of voice replying and temporary storage and the step VII of a post-communication installation of an application program.

The aforementioned keys can be virtual keys on the display screen 111 or physical keys on the hands-free device 11. The physical keys correspond to the aforementioned virtual keys, and there can be one physical key or a plurality of physical keys. Different ways of pressing the physical key can be set to correspond to different functions, for example, long pressing the physical key one time corresponds to the "reply" key, short pressing one time corresponds to the "stop" key, and short pressing two time corresponds to the "play" key. Besides, when the "reply" key 113 appears and has been displayed on the screen for a predetermined period of time without being clicked, the application program A of the hands-free device 11 will automatically rely with a voice message indicating "too busy to answer".

It is learned from the above description that the present invention is able to convert the text messages sent between mobile devices into voice messages, so that the user does not have to fetch the mobile device and read the text message, which improves the driving safety when communication is conducted during driving. In addition to the fact that the received message is converted into voice, the user also replies with voice message, which further improves drive safety since the user does not have to text message while driving. More importantly, the present invention is specially provided with the private server 20, so that the messages from both communication parties can be temporarily stored in the private server 20, the both communication parties can listen to the voice message at any time as long as the mobile device is equipped with the application program A, in other words, both communication parties can choose to or not to listen to the voice message right away according to the situation when the communication is being conducted. More importantly, even if the user is busy or messages cannot be read during the process of communication, he can choose to fetch the messages stored in the private server 20 when he is free, therefore, the present invention allows for both instant communication and non-instant commutation.

Furthermore, the present invention will prompt the message sending end 30 to install an application program A when there is no application program A at the message sending end 30, so that all potential contacts can be ensured to install the application program A, namely, the abovementioned functions and effects of the present invention can be shared by all potential contacts simultaneously.

While we have shown and described various embodiments in accordance with the present invention, it is clear to those skilled in the art that further embodiments may be made without departing from the scope of the present invention.

What is claimed is:

1. A method of receiving and replying messages with a hands-free device, comprising the steps of:
    a) respectively installing an application program on a hands-free device and on a message-receiving-end mobile device at a message receiving end, and registering and enabling both the application programs to be wirelessly connected to a private server, wherein the application program on the hands-free device obtains a contact list data from the message-receiving-end mobile device;
    b) wirelessly connecting the hands-free device to the message-receiving-end mobile device, and connecting the hands-free device to Internet;
    c) sending a message from a message-sending-end mobile device at a message-sending end, by a communication software installed on the message-sending-end mobile device to the message-receiving-end mobile device, and fetching, by the application program of the hands-free mobile device, the message-receiving-end mobile device to obtain a notification message which is sent from a server storing the communication software and received by the message-receiving-end mobile device;
    d) analyzing, by the application program of the hands-free device, the notification message to obtain a type, a sender and a content of the notification message, and displaying the notification message on a display screen of the hands-free device;
    e) voice replying, if the application program of the hands-free device detects that the sender of the notification message matches the contact list data of the application program, the hands-free device will be switched to a voice recording mode to start recording a voice message, then sending the voice message, by the application program of the hands-free device, to the message-sending-end mobile device, so that the message-sending-end mobile device at the message sending end hears the voice message reply from the message receiving end; and
    f) if the application program of the hands-free device detects that the sender of the notification message does not match the contact list data of the application program, then comparing the sender of the notification message with a contact list data stored in the message-receiving-end mobile device, and if a matched telephone number is found, then
    f1) switching the hands-free device to the voice recording mode to start recording a voice message, then sending the voice message to the private server and temporarily storing the voice message in the private server via the application program; and
    f2) sending a prompt message to the message-sending-end mobile device by the application program, wherein the prompt message is a short message service message, and a content of the prompt message is a website address for downloading the application program to prompt a user of the message-sending-end mobile device to download and install the application program, when the user of the message-sending-end mobile device downloads, installs, registers and starts using the application program, the application program of the message-sending-end mobile device is connected to the private server to fetch the voice message temporarily stored in the private server, and the message-sending-end mobile device plays the voice message from the message receiving end.

2. The method as claimed in claim 1, wherein the voice replying is performed by pressing a key which is a virtual key displayed on the display screen or a physical key on the hands-free device.

3. The method as claimed in claim 1, wherein the message-receiving-end mobile device is a smart phone with an IOS system, the message notification message is sent to the hands-free device via Bluetooth low energy, the message-receiving-end mobile device is a smart phone with an Android system, the message notification message is sent to the hands-free device via WIFI, Bluetooth, or Bluetooth low energy.

4. The method as claimed in claim 1, wherein in the step d, the hands-free device converts the text message into voice message, and in the step of voice reply.

5. The method as claimed in claim 1, wherein in the step f2, after the user of the message-sending-end mobile device downloads, installs, registers and starts using the application program, the private server simultaneously controls the application program of the message receiving end and the message sending end to open a chat room.

6. The method as claimed in claim 1, wherein the application program of the hands-free device analyzes the content of the notification message and decodes the application program interface of the communication software, the application program sends the prompt message to the communication software of the message-sending-end mobile device by using the application program interface instead of using short message service.

7. The method as claimed in claim 1, wherein in the step e, when the application program of the hands-free device detects that the sender of the notification message does not match the contact list data of the application program, the application program of the hands-free device compares the sender of the notification message with the contact list data stored on the message-receiving-end mobile device, and if no matched telephone number is found, more than one contact list data are displayed on the display screen of the hands-free device to allow for identifying the identity of the message sending end, after identification, the hands-free device continues to perform the step f1 and the step f2.

8. The method as claimed in claim 1, wherein in the step e, when the application program of the hands-free device detects that the sender of the notification message does not match the contact list data of the application program, the application program of the hands-free device compares the sender of the notification message with the contact list data stored on the message-receiving-end mobile device, if no matched telephone is found, results are sequenced based on matching rate and will be displayed on the display screen to allow for manual selection and identification of the identity of the message sending end, after selection and identification, the hands-free device will continue to perform the step of voice reply and temporary storage and the step of a post-communication installation of an application program.

9. A method of receiving and replying messages with a hands-free device, comprising the steps of:
 a) respectively installing an application program on a hands-free device and a message-receiving-end mobile device at a message receiving end, wherein the application program on the hands-free device obtains a contact list data from the message-receiving-end mobile device, registers and enables both the application programs to be wirelessly connected to a private server;
 b) wirelessly connecting the hands-free device to the message-receiving-end mobile device, and connecting the hands-free device to Internet;
 c) sending a message from a message-sending-end mobile device at a message-sending end, by a communication software installed on the message-sending-end mobile device to the message-receiving-end mobile device, and fetching, by the application program of the hands-free mobile device, the message-receiving-end mobile device to obtain a notification message which is sent from a server storing the communication software and received by the message-receiving-end mobile device;
 d) analyzing, by the application program of the hands-free device, the notification message to obtain a type, a sender and a content of the notification message, and displaying the notification message on a display screen of the hands-free device;
 e) voice replying, if the application program of the hands-free device detects that the sender of the notification message matches the contact list data of the application program, then switching the hands-free device to a voice recording mode and start recording a voice message, and sending the voice message, by the application program of the hands-free device, to the message-sending-end mobile device, so that the message-sending-end mobile device at the message sending end hears the voice message reply from the message receiving end; and
 f) if the application program of the hands-free device detects that the sender of the notification message does not match the contact list data of the application program, displaying more than one contact list data on the display screen of the hands-free device for selection, and if one of the contact list data is selected, then
 f1) switching the hands-free device to the voice recording mode to start recording a voice message, pressing the "stop" key to stop recording, then sending the voice message to the private server and temporarily storing the voice message in the private server via the application program; and
 f2) sending a prompt message to the message-sending-end mobile device by the application program, wherein the prompt message is a short message service message, and a content of the prompt message is a website address for downloading the application program to prompt the user of the message-sending-end mobile device to download and install the application program, when the user of the message-sending-end mobile device downloads, installs, registers and starts using the application program, the application program of the message-sending-end mobile device is connected to the private server to fetch the voice message temporarily stored in the private server, and the message-sending-end mobile device plays the voice message from the message receiving end.

10. The method as claimed in claim 9, wherein the voice replying is performed by pressing a key which is a virtual key displayed on the display screen or a physical key on the hands-free device.

11. The method as claimed in claim 9, wherein the message-receiving-end mobile device is a smart phone with an IOS system, the message notification message is sent to the hands-free device via Bluetooth low energy, the message-receiving-end mobile device is a smart phone with an Android system, the message notification message is sent to the hands-free device via WIFI, Bluetooth or Bluetooth low energy.

12. The method as claimed in claim 9, wherein in the step d, the hands-free device converts the text message into voice message, and in the step of voice reply.

13. The method as claimed in claim 9, wherein in the step f2, after the user of the message-sending-end mobile device downloads, installs, registers and starts using the application program, the private server simultaneously controls the application program of the message receiving end and the message sending end to open a chat room.

14. The method as claimed in claim 9, wherein in the step e, when the application program of the hands-free device detects that the sender of the notification message does not match the contact list data of the application program, the application program of the hands-free device compares the sender of the notification message with the contact list data stored on the message-receiving-end mobile device, results are sequenced based on matching rate and are displayed on the display screen to allow for manual selection and identification of the identity of the message sending end, after selection and identification, the hands-free device will continue to perform the step f1 and the step f2.

15. The method as claimed in claim 9, wherein the application program of the hands-free device analyzes the content of the notification message and decodes the application program interface of the communication software, the application program sends the prompt message to the communication software of the message-sending-end mobile device by using the application program interface instead of using short message service.

* * * * *